US 11,551,258 B1

(12) United States Patent
Senthil

(10) Patent No.: US 11,551,258 B1
(45) Date of Patent: Jan. 10, 2023

(54) SYSTEM AND METHOD FOR ADVERTISEMENT SPACE RECOMMENDATION AND A CHECKOUT PROCESS FOR AN E-COMMERCE PLATFORM

(71) Applicant: Kumar N Senthil, Sammamish, WA (US)

(72) Inventor: Kumar N Senthil, Sammamish, WA (US)

(73) Assignee: Kumar N Senthil, Sammamish, WA (US)

( * ) Notice: Subject to any disclaimer, the term of this patent is extended or adjusted under 35 U.S.C. 154(b) by 0 days.

(21) Appl. No.: 17/317,952

(22) Filed: May 12, 2021

(51) Int. Cl.
*G06Q 30/00* (2012.01)
*G06Q 30/02* (2012.01)
*G06Q 30/06* (2012.01)
*G09F 9/30* (2006.01)
*G06Q 50/00* (2012.01)
*G06Q 10/08* (2012.01)
*G06F 16/955* (2019.01)
*G06F 16/9535* (2019.01)
*G06F 9/54* (2006.01)

(52) U.S. Cl.
CPC ......... *G06Q 30/0246* (2013.01); *G06F 9/547* (2013.01); *G06F 16/9535* (2019.01); *G06F 16/9566* (2019.01); *G06Q 10/087* (2013.01); *G06Q 30/0201* (2013.01); *G06Q 30/0249* (2013.01); *G06Q 30/0253* (2013.01); *G06Q 30/0275* (2013.01); *G06Q 30/0277* (2013.01); *G06Q 30/0633* (2013.01); *G06Q 50/01* (2013.01); *G09F 9/30* (2013.01)

(58) Field of Classification Search
CPC ................. G06Q 30/0207–0277; G06Q 50/01
See application file for complete search history.

(56) References Cited

U.S. PATENT DOCUMENTS

| 8,190,504 | B1 * | 5/2012 | Stolz | G06Q 40/12 |
| | | | | 705/30 |
| 11,151,419 | B1 * | 10/2021 | Raina | G06N 7/005 |
| 2002/0103698 | A1 * | 8/2002 | Cantrell | G06Q 30/02 |
| | | | | 705/14.55 |

(Continued)

FOREIGN PATENT DOCUMENTS

CN 111178947 A 5/2020

*Primary Examiner* — Luis A Brown
(74) *Attorney, Agent, or Firm* — Jason C. Cameron

(57) ABSTRACT

A system for advertisement space recommendation and a checkout process is provided. The system includes an advertisement space recommendation module determines an expected network traffic for each product. The advertisement space recommendation module determines expected profits corresponding to merchants based on expected network traffic and generates a recommendation corresponding to a set of advertisement space to the merchants for selling the products. The system includes an auction module enables the merchants to bid for the set of advertisement space to exhibit the corresponding products. The system includes a checkout URL generator module creates a distinctive URL for the set of advertisement space and enables one-click checkout process for the products displayed on the set of advertisement space on an advertisement platform based on URL for each product across merchants.

17 Claims, 4 Drawing Sheets

(56) References Cited

U.S. PATENT DOCUMENTS

| | | | | |
|---|---|---|---|---|
| 2003/0171990 A1* | 9/2003 | Rao | G06Q 30/0264 | 705/14.54 |
| 2004/0030611 A1* | 2/2004 | Byrne | G06Q 30/0605 | 705/26.2 |
| 2005/0182722 A1* | 8/2005 | Meyer | G06Q 10/06 | 705/40 |
| 2005/0189414 A1* | 9/2005 | Fano | G06Q 30/02 | 705/14.27 |
| 2005/0189415 A1* | 9/2005 | Fano | G06Q 30/02 | 705/14.69 |
| 2008/0126192 A1* | 5/2008 | Patel | G06Q 30/0275 | 705/14.46 |
| 2008/0262945 A1* | 10/2008 | Clark | G06F 16/86 | 707/999.005 |
| 2008/0294524 A1* | 11/2008 | Badros | G06Q 30/0275 | 705/14.54 |
| 2011/0238486 A1* | 9/2011 | Liu | G06Q 30/0244 | 705/14.42 |
| 2012/0173351 A1* | 7/2012 | Hanson | G06Q 30/0635 | 705/26.81 |
| 2013/0325524 A1* | 12/2013 | Boudville | G06Q 30/06 | 705/5 |
| 2013/0339132 A1* | 12/2013 | von Gonten | G06Q 30/0241 | 705/14.45 |
| 2014/0337133 A1* | 11/2014 | Shaw | G06Q 30/02 | 705/14.54 |
| 2015/0073925 A1* | 3/2015 | Renfroe | G06Q 10/087 | 705/15 |
| 2016/0086244 A1* | 3/2016 | Dinardo, Jr. | H04L 12/189 | 705/26.41 |
| 2017/0236196 A1* | 8/2017 | Isaacson | G06Q 20/12 | 705/14.51 |
| 2018/0025390 A1* | 1/2018 | Penner | H04W 4/21 | 705/14.71 |

* cited by examiner

SYSTEM AND METHOD FOR ADVERTISEMENT SPACE RECOMMENDATION AND A CHECKOUT PROCESS FOR AN E-COMMERCE PLATFORM

FIELD OF INVENTION

Embodiments of the present disclosure relate to online advertising and more particularly to a system and a method for advertisement space recommendation and a checkout process for an e-commerce platform.

BACKGROUND

A vast amount of data and information is available via the Internet and content may be provided from a correspondingly vast number of sources. Some of the forms with such content may include web pages, websites, search results, emails and the like. Content sources, including publishers, may wish to include web-based, on-line or other forms of electronic advertisement slots ("ads") in association with the access to or provisioning of the content. The form, substance, and other characteristics or parameters of such advertising may be many and varied and may be considered to create an inventory of advertisement slots for example advertisement products. In the advertisement platform, there is contract advertisement system composed of commodity, advertisement auction person and advertiser. The advertisement auction person obtains on-line exposure in effective time period by buying advertisement position of different commodity, so as to obtain on-line passenger source, and then guides the passenger source to make deal.

In currently available systems, whether the advertisement space is obtained or not is determined by the bid price of the advertisement auction player, and the profits of the advertiser and the advertisement auction player cannot be effectively improved. In one scenario, once the advertisement slot is allotted auction player, the consumers may or may not complete the e-commerce transaction using a checkout procedure when they see the advertisement online on any platform especially when the checkout process is complicated or too many steps involved in the checkout experience. Many consumers tend to not complete the checkout if the checkout experience forces the consumer to create an account during checkout. More frictions in the checkout process leads to poor return on investment for the advertisers.

Hence, there is a need for an improved system and method for advertisement space recommendation and a checkout process for an e-commerce platform to address the aforementioned issue(s).

BRIEF DESCRIPTION

In accordance with an embodiment of the present disclosure, a system for advertisement space recommendation and a checkout process for an e-commerce platform is provided. The system includes an application programming interface configured to enable communication with the one or more e-commerce websites. The system also includes a processing subsystem hosted on a server and configured to execute on a network to control bidirectional communications among a plurality of modules. The processing subsystem includes a data collection module configured to receive data corresponding to a plurality of data sources from one or more merchants. In one embodiment, the data corresponding to the plurality of data sources comprises at least one of a demand from the one or more merchants, premium demanded by an advertisement platform, demographics and budget. The processing subsystem includes an advertisement space recommendation module configured to determine an expected network traffic for each of a plurality of products. The advertisement space recommendation module is also configured to determine expected profits corresponding to one or more merchants based on expected network traffic of the plurality of products. The advertisement space recommendation module is further configured to generate a recommendation corresponding to a set of advertisement space to the one or more merchants for selling the plurality of products upon determining the expected profits and the data received by the data collection module. In one embodiment, the set of advertisement space comprises one or more unoccupied advertisement slots in the advertisement platform. The processing subsystem also includes an auction module configured to enable the one or more merchants to bid for the set of advertisement space recommended by the advertisement space recommendation module to exhibit the corresponding plurality of products. The processing subsystem further includes a checkout URL generator module configured to create a distinctive uniform resource locator (URL) for each of the plurality of products corresponding to the set of advertisement space bidding by the one or more merchants via the auction module. The checkout URL generator module is also configured to enable one-click checkout process for the plurality of products displayed on the advertisement space based on the distinctive URL for the plurality of products across one or more merchants. In one embodiment, the advertisement platform comprises at least one of a social network platform, a search engine platform, the e-commerce platform, a mobile application or a physical billboard.

In accordance with another embodiment of the present disclosure, a method for advertisement space recommendation and a checkout process for an e-commerce platform is provided. The method includes receiving, by the data collection module, data corresponding to a plurality of data sources from one or more merchants. The method includes determining, by an advertisement space recommendation module, an expected network traffic for each of a plurality of products. The method also includes determining, by the advertisement space recommendation module, expected profits corresponding to the one or more merchants based on expected network traffic of the plurality of products. The method further includes generating, by the advertisement space recommendation module, a recommendation corresponding to a set of advertisement space to the one or more merchants for selling the plurality of products upon determining the expected profits and the data received by the data collection module. The method further includes enabling, by an auction module, the one or more merchants to bid for the set of advertisement space recommended by the advertisement space recommendation module to exhibit the corresponding plurality of products. The method further includes creating, by a checkout URL generator module, a distinctive uniform resource locator (URL) for each of the plurality of products corresponding to the set of advertisement space biding by the one or more merchants via the auction module. The method further includes enabling, by the checkout URL generator module, one-click checkout process for the plurality of products displayed on the set of advertisement space on an advertisement slot based on the distinctive URL for the plurality of products across one or more merchants.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
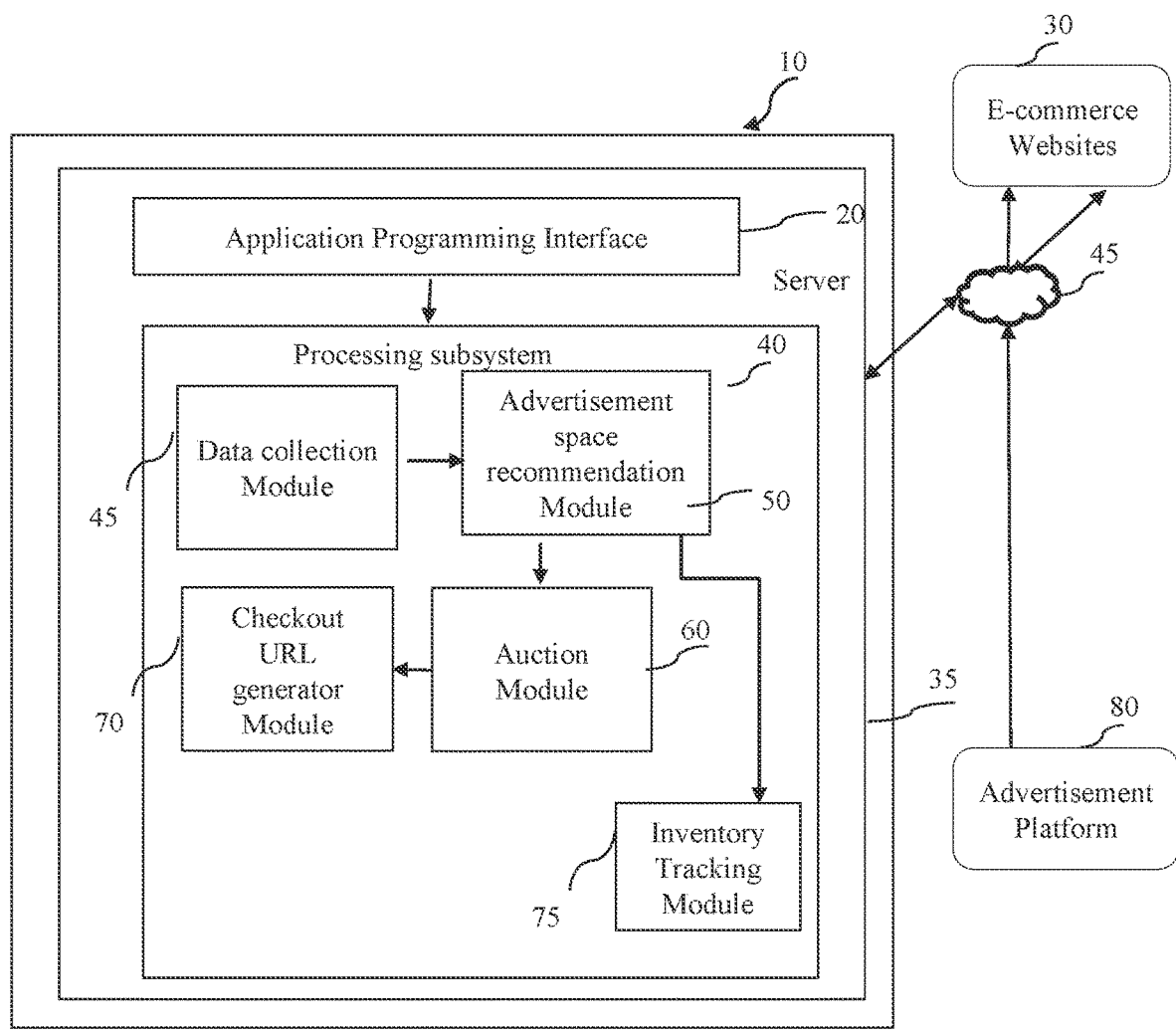
FIG. 1 is a block diagram representation of system for advertisement space recommendation and a checkout process for an e-commerce platform in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to for advertisement space recommendation and a checkout process for an e-commerce platform. As used herein, an "e-commerce platform" is a platform which enables creation and management of an online store including products, site, operations, and everything else related to online sales. Similarly, the "advertisement space" is an area of a website or a web page dedicated to online advertisements. The advertisement space is critical for organizations and websites driven by advertising revenue. Furthermore, "advertisement space recommendations" are the recommendations which may introduce the user to new, relevant features, help to get more out of the budget by improving bidding, keywords, and ads, and may work to increase the overall performance and efficiency of the campaigns.

FIG. 1 is a block diagram representation of a system for advertisement space recommendation and a checkout process for an e-commerce platform in accordance with an embodiment of the present disclosure. The system 10 includes an application programming interface 20 configured to enable communication with one or more e-commerce websites 30. As used herein, the e-commerce website is a site that sells products and services through means of the data transfer and funds over the internet. As used herein, the application programming interface 20 (API) is a computing interface that defines interactions between multiple software intermediaries. The API defines the kinds of calls or requests which may be made, how to make them, the data formats that should be used, the conventions to follow, or the like. In one embodiment, the API may be remote APIs or web APIs. The remote APIs allow to manipulate remote resources through protocols, specific standards for communication that further allow different technologies to work together, regardless of language or platform. The web APIs are the defined interfaces through which interactions happen between an enterprise and applications that use its assets, which also is a Service Level Agreement (SLA) to specify the functional provider and expose the service path or URL for its API users.

The system 10 also includes a processing subsystem 40 hosted on a server 35. In one embodiment, the server 35 may be a cloud-based server. In another embodiment, parts of the server 35 may be a local server coupled to a user device. The processing subsystem 40 is configured to execute on a network 45 to control bidirectional communications among a plurality of modules. In one embodiment, the network 45 may include one or more terrestrial and/or satellite networks interconnected to communicatively connect the user device to web server engine and a web crawler. In one example, the network 45 may be a private or public local area network (LAN) or Wide Area Network (WAN), such as the Internet. In another embodiment, the network 60 may include both wired and wireless communications according to one or more standards and/or via one or more transport mediums. In one example, the network 45 may include wireless communications according to one of the 802.11 or Bluetooth specification sets, or another standard or proprietary wireless communication protocol. In yet another embodiment, the network 60 may also include communications over a terrestrial cellular network, including, a GSM (global system for mobile communications), CDMA (code division multiple access), and/or EDGE (enhanced data for global evolution) network.

The processing subsystem includes a data collection module 45 configured to receive data corresponding to a plurality of data sources from one or more merchants. In one embodiment, the data corresponding to the plurality of data sources may include at least one of a demand from the one or more merchants, premium demanded by the advertisement platform, demographics and budget. The processing subsystem 40 includes an advertisement space recommendation module 50 which is configured to determine an expected network traffic for each of a plurality of products. When a product is displayed on an advertisement platform, a user may browse the displayed product. In one embodiment, larger the browsing amount is, larger the network traffic corresponding to the product is and the larger the revenue may be brought to an advertisement auction owner and an advertisement owner. In another embodiment, the expected network traffic in the future of the product may be determined through the network traffic of the product history to determine the commercial value of the product. Moreover, different products may be provided with different numbers of advertisement space due to different expected network traffic.

Furthermore, the advertisement space recommendation module 50 is configured to determine expected profits corresponding to one or more merchants based on expected network traffic of the plurality of products. In one embodiment, the advertisement space recommendation module 50 is configured to access data corresponding to the set of advertisement space over a network. More specifically, the expected profits of corresponding to the one or more merchants when the one or more merchants obtain an advertisement space corresponding to a product may be determined by the product of the estimated flow rate and the familiarity of the product corresponding to the product of the one or more merchants according to the following formula.

$$V_{ij} = L_{ij} * I_{ij}$$

$V_{ij}$ represents the expected profit obtained when the jth merchant purchases the advertisement space of the ith product and the expected profit is based on the product familiarity L of the merchant and estimated flow I divided from merchant.

In one embodiment, the advertisement space recommendation module 50 is configured to determine a plurality of estimated flow rates corresponding to the one or more merchants based on the expected network flow rate of each of the plurality of products, wherein each of the plurality of estimated flow rate corresponds to product. Moreover, the advertisement space recommendation module 50 is further configured to generate a recommendation corresponding to a set of advertisement space to the one or more merchants for selling the plurality of products upon determining the expected profits and the data received by the data collection module. In a specific embodiment, the set of advertisement space may include one or more unoccupied advertisement slots in advertisement platform such as at least one of the social network platform, the e-commerce platform, a search engine platform, a mobile application or a physical billboard.

In some embodiments, the advertisement space recommendation module 50 is configured to display data related to the set of advertisement space on the user interface. The data is displayed by receiving user input corresponding to the selection from the set of advertisement space. More specifically, the set of advertisement space is displayed on the user interface where the user interface enables the merchant to select preferred advertisement spaces from the set of advertisement space available on the at least one of the social network platform and the e-commerce platform. In one embodiment, the advertisement space recommendation module is configured to generate recommendation corresponding to the set of advertisement space upon determining relevancy of the advertisement platform corresponding to the plurality of products. More specifically, the advertisement space recommendation module enables the user via the user interface to advertise the products as per the relevancy of the advertisement platform.

Subsequently, the processing subsystem 40 includes an auction module 60 configured to enable the one or more merchants to bid for the set of advertisement space recommended by the advertisement space recommendation module to exhibit the corresponding plurality of products. The one or more merchants bid for the advertisement spaces selected by the merchants previously from the set of advertisement space. For the one or more products to be listed on the selected advertisement space, a corresponding platform owner may demand a price which the merchant may bid for such space. This way not every platform owner will need to build this infrastructure at the time they get that capability. On the other side, the auction module provides the capability for the merchants to bid where they want their products to be listed in the platform to build brand awareness and improve sales.

In addition, the processing subsystem 40 includes a checkout URL generator module 70 which is configured to create a distinctive uniform resource locator (URL) for each of the plurality of products corresponding to the set of advertisement space biding by each of the plurality of products corresponding to the auction module. More specifically, when a customer looks for the product be able to purchase displayed on the advertisement space purchased by the merchant, the checkout URL generator module 70 enables the customer to redirect to the e-commerce platform of the merchant when the customer clicks on the advertisement displayed on the advertisement space to enable purchase of the product displayed on the advertisement as well as regular catalog displayed in the advertisement.

Further, the checkout URL generator module 70 is configured to enable one-click checkout process for the plurality of products displayed on the set of advertisement space on an advertisement platform 80 based on the distinctive URL for the plurality of products across one or more merchants. In a specific embodiment, the advertisement platform may include at least one of a social network platform, a search engine platform, the e-commerce platform, a mobile application or a physical billboard. In such an embodiment, the physical billboard is associated with a scanning code comprising a barcode, a QR code or a picture to identify the plurality of products. In one embodiment, the checkout URL generator module 70 is configured to store the user information to enable one-click checkout process for following transactions from corresponding user interface. In such an embodiment, the one-click checkout process is executed either synchronously or in a batch mode asynchronously at a scheduled time. In a specific embodiment, the checkout URL generator module 70 is configured to fill a web based form for a user and make one or more API calls to the advertisement platform to enable the one-click checkout flow. In such an embodiment, checkout URL generator module 70 is configured to make one or more server calls to the e-commerce website from at least one of the server or a browser based on filled web-based form to complete a checkout process.

In detail, the customer sees an advertisement for a product which is "one-click enabled" in any social network and other scenarios. When the customer clicks on the distinctive URL, the customer will be taken to checkout page. This is accomplished by working with the merchant to publish the advertisements using one click checkout URL instead of the URL that takes the customer to the merchant's website. First time the customer will enter their credit card info, billing and shipping address. After that they do not need to enter such information, if they transact with the same device. All the information will be encrypted using server's public key and stored with the client. Once the customer places the order, the checkout processing module transmits the order to the website using merchant's API if such API is available otherwise the checkout URL generator module use form post. This way no change is needed in the merchant's website.

In one embodiment, the processing subsystem 40 may include an inventory tracking module 75 operatively coupled to the advertisement space recommendation module 50. The inventory tracking module 75 is configured to track inventory associated with the one or more e-commerce websites of the corresponding merchant for an advertisement space recommended by the advertisement space recommendation module 50. In such an embodiment, the inventory tracking module 75 is also configured to stop the advertisement on the advertisement space when one of the plurality of product displayed on the advertisement is out of stock upon tracking the inventory.

Figure 2:
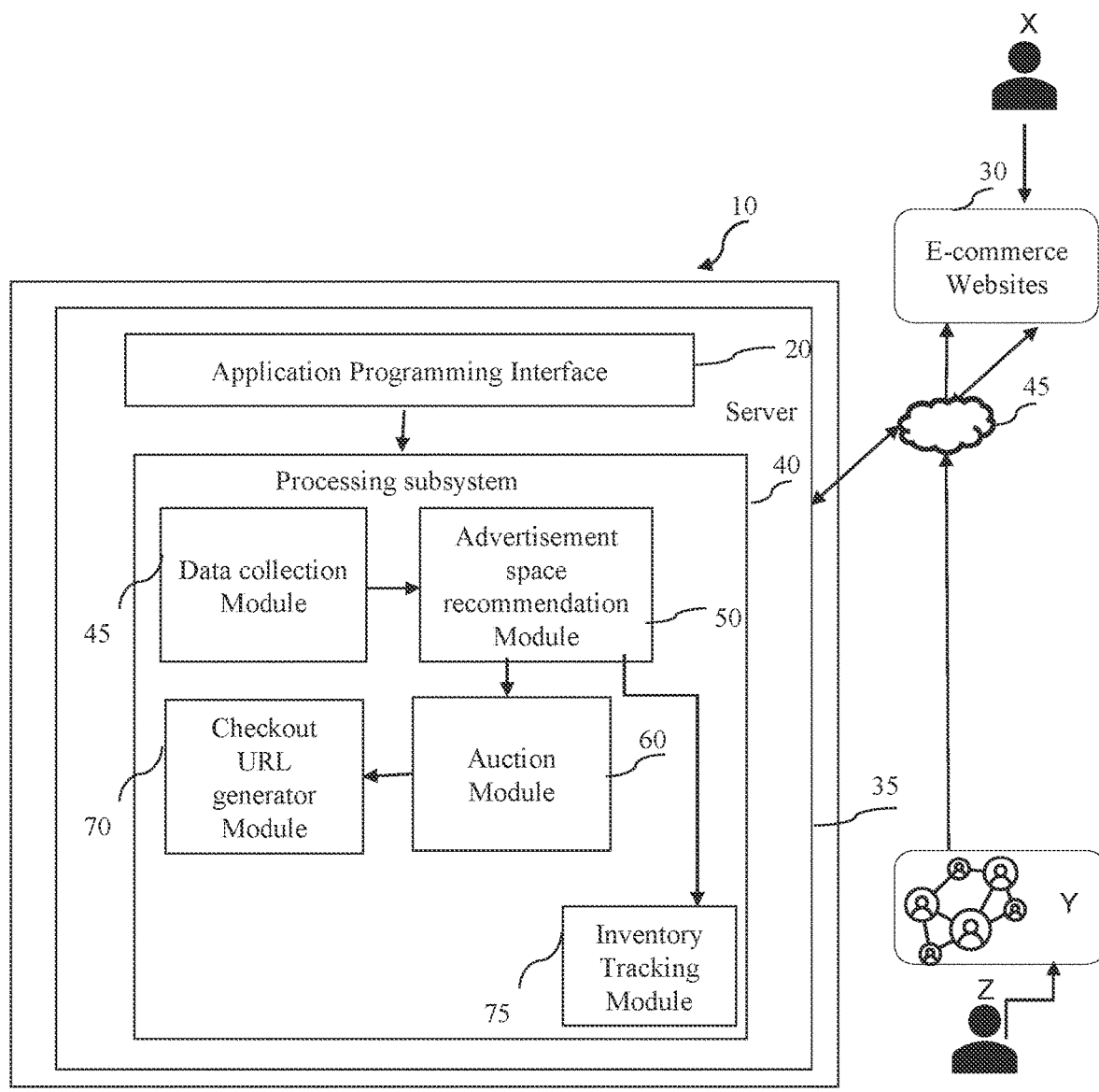
FIG. 2 is a schematic representation of an exemplary system of FIG. 1 in accordance with an embodiment of the present disclosure.

FIG. 2 is a schematic representation of an exemplary embodiment of the system of FIG. 1 in accordance with an embodiment of the present disclosure. Considering a non-limiting example where a merchant X is looking for an advertisement space on a social network platform Y to advertise a catalog product and enable one click checkout process for a customer Z for purchasing of the advertised product or the catalog products listed on the corresponding website of the merchant X. The advertisement space recommendation module 50 determines an expected network traffic with respect to the advertisement spaces which are preoccupied by the different merchants for their corresponding products. The expected network traffic in the future of the product may be determined through the network traffic of the product history to determine the commercial value of the product. Furthermore, the expected profits of corresponding to the different merchants when the different merchants obtain an advertisement space corresponding to a product may be determined by the product of the estimated flow rate and the familiarity of the product corresponding to the product of the different merchants. Moreover, based on the expected profit, the advertisement space recommendation module 50 generates a recommendation of unoccupied advertisement space on the social network platform Y for advertising his products. Further, the unoccupied advertisement space is displayed on the user interface where the user interface enables the merchant X to select preferred advertisement space from the recommended unoccupied advertisement space available on the social network platform Y. Subsequently, the merchant X bid for the advertisement spaces selected previously from the unoccupied advertisement space. For the one or more products to be listed on the selected advertisement space, owner of the social network platform may demand a price which the merchant X may bid for such space. This way not every platform owner will need to build this infrastructure at the time they get that capability. On the other side, the auction module 60 provides the capability for the merchants to bid where they want their products to be listed in the platform to build brand awareness and improve sales.

Consequently, when the customer sees the product be able to purchase displayed on the advertisement space purchased by the merchant X, the checkout URL generator module 70 enables the customer to redirect to the website of the merchant X when the customer Z clicks on the advertisement displayed on the advertisement space on the social network platform Y to enable purchase of the product displayed on the advertisement as well as regular catalog displayed in the advertisement. When the customer Z clicks on the product displayed on the social network platform Y, the customer Z will be taken to checkout page. This is accomplished by working with the merchant X to publish the advertisements using one click checkout URL instead of the URL that takes the customer Z to the merchant's website. First time the customer Z will enter their credit card info, billing and shipping address. After that they do not need to enter such information, if they transact with the same device. All the information will be encrypted using server's public key and stored with the client. Once the customer Z places the order, the checkout URL generator module transmits the order to the website using merchant's API if such API is available otherwise the checkout URL module use form post. This way no change is needed in the merchant's website. In case there is no inventory for the product displayed on the advertisement space, then the inventory tracking module 75 automatically turn off the advertisement for such product.

Figure 3:
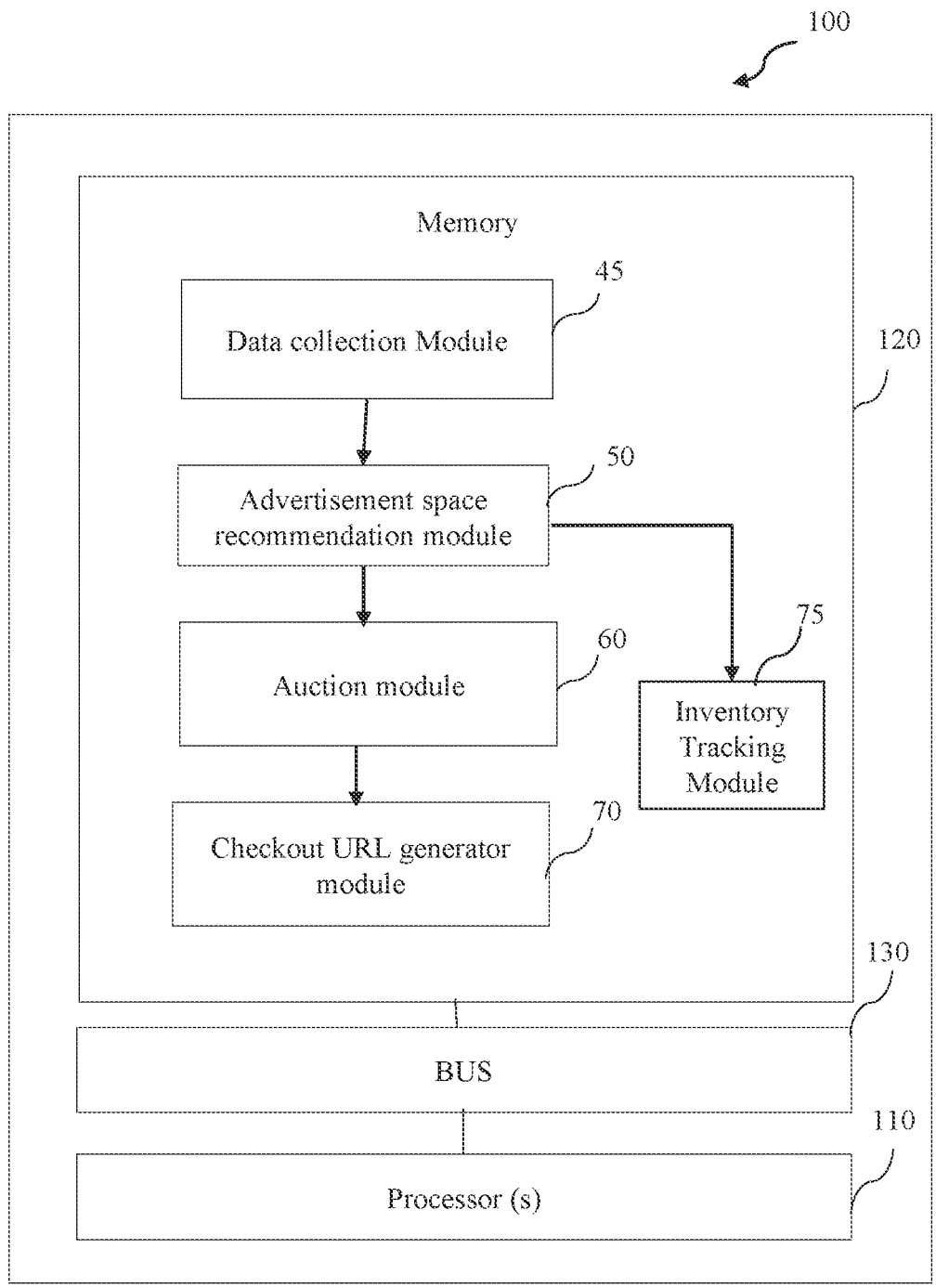
FIG. 3 is a block diagram of a computer or a server for system in accordance with an embodiment of the present disclosure.

FIG. 3 is a block diagram of a computer or a server 100 for system 10 in accordance with an embodiment of the present disclosure. The server includes processor(s) 110, and memory 120 operatively coupled to the bus 130.

The processor(s) 110, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 120 includes a plurality of subsystems and a plurality of modules stored in the form of executable program which instructs the processor 110 to perform the method steps illustrated in FIG. 1. The memory 120 is substantially similar to the system 10 of FIG. 1. The memory 120 has following subsystems: a processing subsystem 40 including the advertisement space recommendation module 50, the auction module 60, the checkout URL generator module 70 and the inventory tracking module 75.

The processing subsystem includes a data collection module configured to receive data corresponding to a plurality of data sources from one or more merchants. In one embodiment, the data corresponding to the plurality of data sources comprises at least one of a demand from the one or more merchants, premium demanded by an advertisement platform, demographics and budget. The processing subsystem includes an advertisement space recommendation module configured to determine an expected network traffic for each of a plurality of products. The advertisement space recommendation module is also configured to determine expected profits corresponding to one or more merchants based on expected network traffic of the plurality of products. The advertisement space recommendation module is further configured to generate a recommendation corresponding to a set of advertisement space to the one or more merchants for selling the plurality of products upon determining the expected profits and the data received by the data collection module. In one embodiment, the second set of advertisement space comprises one or more unoccupied advertisement slots in the advertisement platform. The processing subsystem also includes an auction module configured to enable the one or more merchants to bid for the set of advertisement space recommended by the advertisement space recommendation module to exhibit the corresponding plurality of products.

The processing subsystem further includes a checkout URL generator module configured to create a distinctive uniform resource locator (URL) for each of the plurality of products corresponding to the set of advertisement space bidding by the one or more merchants via the auction module. The checkout URL generator module is also configured to enable one-click checkout process for the plurality of products displayed on the advertisement space based on the distinctive URL for the plurality of products across one or more merchants. In one embodiment, the advertisement platform comprises at least one of a social network platform, a search engine platform, the e-commerce platform, a mobile application or a physical billboard. In one embodiment, the processing subsystem may include an inventory tracking module operatively coupled to the advertisement space recommendation module. The inventory tracking module is configured to track inventory associated with the one or more e-commerce websites of the corresponding merchant for an advertisement space recommended by the advertisement space recommendation module. In such an embodiment, the inventory tracking module is also configured to stop the advertisement on the advertisement space when one of the plurality of product displayed on the advertisement is out of stock upon tracking the inventory.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 110.

Figure 4:
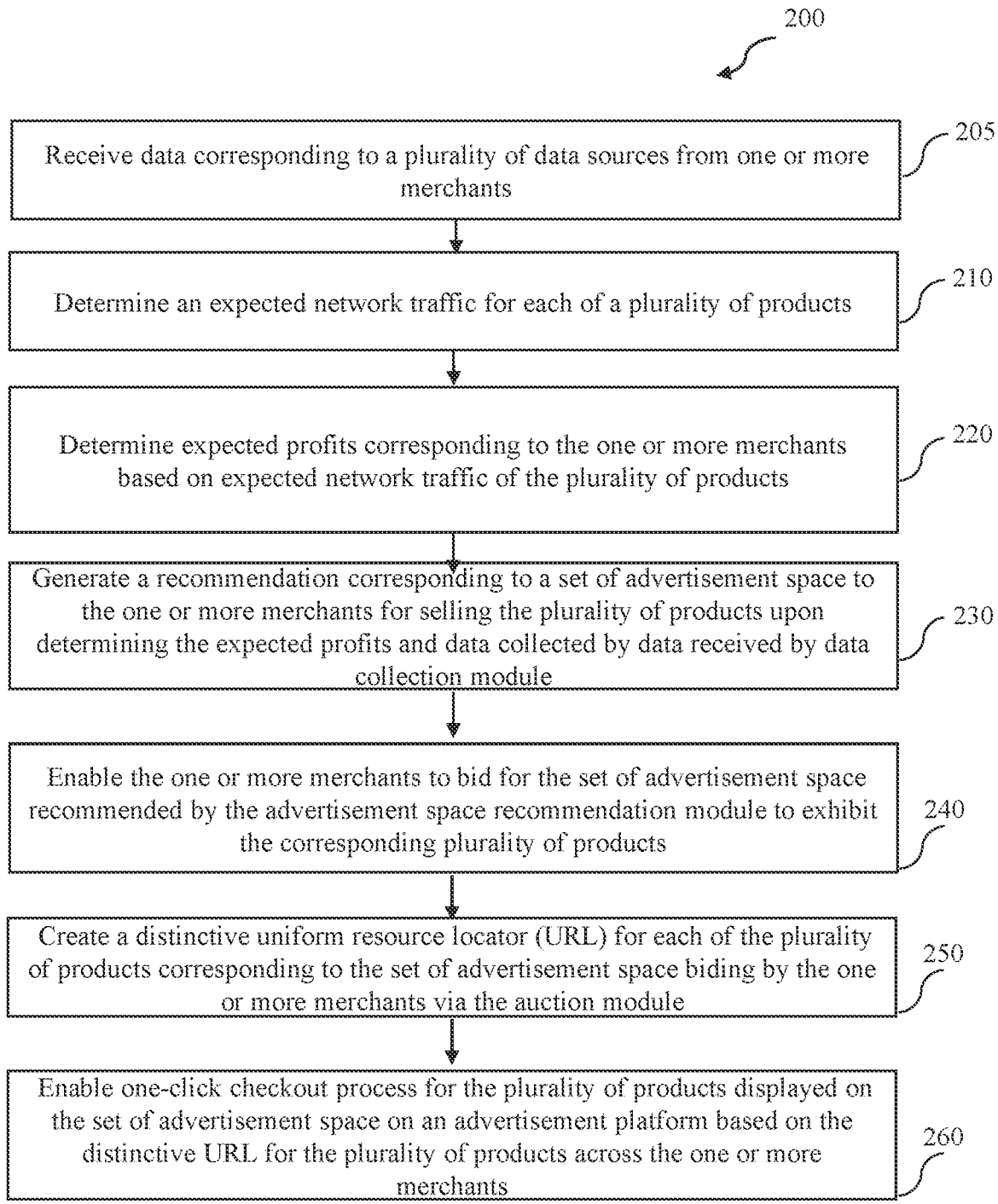
FIG. 4 illustrates a flow chart representing the steps involved in a method for advertisement space recommendation and a checkout process for an e-commerce platform in accordance with an embodiment of the present disclosure.

FIG. 4 is a flow chart representing the steps involved in a method 200 for advertisement space recommendation and a checkout process for an e-commerce platform in accordance with an embodiment of the present disclosure. The method 200 includes enabling communication with the one or more e-commerce websites by an application programming interface. The method 200 also includes executing on a network to control bidirectional communications among a plurality of modules by a processing subsystem hosted on a server. In one embodiment, the server may be a cloud-based server. In another embodiment, parts of the server may be a local server coupled to a user device. The method includes receiving, by the data collection module, data corresponding to a plurality of data sources from one or more merchants in step 205. In one embodiment, the data corresponding to the plurality of data sources comprises at least one of a demand from the one or more merchants, premium demanded by the advertisement platform, demographics and budget. The method 200 includes determining, by an advertisement space recommendation module, an expected network traffic for each of a plurality of products in step 210. In one embodiment, larger the browsing amount is, larger the network traffic corresponding to the product is and the larger the revenue may be brought to an advertisement auction owner and an advertisement owner. In another embodiment, the expected network traffic in the future of the product may be determined through the network traffic of the product history to determine the commercial value of the product.

The method 200 also includes determining, by the advertisement space recommendation module, expected profits corresponding to the one or more merchants based on expected network traffic of the plurality of products in step 220. In one embodiment, the method includes accessing data corresponding to the set of advertisement space over a network by the advertisement space recommendation module. In one embodiment, the method includes determining a plurality of estimated flow rates corresponding to the one or more merchants based on the expected network flow rate of each of the plurality of products, wherein each of the plurality of estimated flow rate corresponds to product. In a specific embodiment, the set of advertisement space may include one or more unoccupied advertisement slots in at least one of the social network platform and the e-commerce platform. In some embodiments, the method includes display data related to the set of advertisement space on the user interface. The data is displayed by receiving user input corresponding to the selection from the set of advertisement space.

The method 200 further includes generating, by the advertisement space recommendation module, a recommendation corresponding to a set of advertisement space to the one or more merchants for selling the plurality of products upon determining the expected profits and the data received by the data collection module in step 230. The method 200 further includes enabling, by an auction module, the one or more merchants to bid for the set of advertisement space recommended by the advertisement space recommendation module to exhibit the corresponding plurality of products in steps 240. The one or more merchants bid for the advertisement spaces selected by the merchants previously from the set of advertisement space. For the one or more products to be listed on the selected advertisement space, a corresponding platform owner may demand a price which the merchant may bid for such space. This way not every platform owner will need to build this infrastructure at the time they get that capability.

The method 200 further includes creating, by a checkout URL generator module, a distinctive uniform resource locator (URL) for each of the plurality of products corresponding to the set of advertisement space biding by the one or more merchants via the auction module in step 250. The method 200 further includes enabling, by the checkout URL generator module, one-click checkout process for the plurality of products displayed on the set of advertisement space on an advertisement platform based on the distinctive URL for the plurality of products across one or more merchants in step 260. In a specific embodiment, the advertisement platform may include at least one of a social network platform, a search engine platform, the e-commerce platform, a mobile application or a physical billboard. In such an embodiment, the physical billboard is associated with a scanning code comprising a barcode, a QR code or a picture to identify the plurality of products. In one embodiment, the checkout URL generator module is configured to store the user information to enable one-click checkout process for following transactions from corresponding user interface. In such an embodiment, the one-click checkout process is executed either synchronously or in a batch mode asynchronously at a scheduled time. In a specific embodiment, the checkout URL generator module is configured to fill a web based form for a user and make one or more API calls to the at least one of the social network platform and the e-commerce platform to enable the one-click checkout flow. In such an embodiment, checkout URL generator module is configured to make one or more server calls to the e-commerce website from at least one of the server or a browser based on filled web-based form to complete a checkout process. In one embodiment, the method includes tracking, by an inventory tracking module, inventory associated with the one or more e-commerce websites of the corresponding merchant for an advertisement space recommended by the advertisement space recommendation module 50. In such an embodiment, the method includes stopping, by the inventory tracking module, the advertisement on the advertisement space when one of the plurality of product displayed on the advertisement is out of stock upon tracking the inventory.

Various embodiments of the system and method for advertisement space recommendation and a checkout process for an e-commerce platform described above enables a global solution based on available inventory and various ad campaign requests that may include desired level of budgets, quantities and qualities. The system is provided for solving the ad placement problem for a set of ad campaigns. The formulation takes into consideration inventory limitations, ad campaign budget constraints, search relevance, and click conversion rates, among other things. The formulation may be applied to solve a wide range of problems, including without limitation budget limited inventory optimization, advertiser keywords and bid recommendations. The system is configured to capture the essentials of the problems and to be flexible enough to fit into various applications. The objective of the system may be to maximize the overall revenue and keep a high relevance level for each search page. Alternatively, in case of the ad campaign recommendations, the objective may be to maximize the total clicks under a specified budget amount for each ad campaign.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A server for advertisement space recommendation and a checkout process for an e-commerce platform comprising:
   an application programming interface configured to enable communication with the one or more e-commerce websites;
   a processor; and
   a memory coupled to the hardware processor, wherein the memory comprises a set of program instructions in the form of a plurality of modules, configured to be executed on a network to control bidirectional communications among the plurality of modules by the hardware processor, wherein the plurality of modules comprises:
   a data collection module configured to receive data corresponding to a plurality of data sources from one or more merchants;
   an advertisement space recommendation module configured to:
   determine an expected network traffic for each of a plurality of products;
   determine a plurality of estimated flow rates corresponding to the one or more merchants based on the expected network traffic of each of the plurality of products, wherein each of the plurality of estimated flow rates correspond to product;
   determine expected profits corresponding to the one or more merchants based on the expected network traffic of the plurality of products;
   generate a recommendation corresponding to a set of advertisement space to the one or more merchants for selling the plurality of products upon determining the expected profits, relevancy of an advertisement platform corresponding to the plurality of products and the data received by the data collection module;
   an auction module configured to enable the one or more merchants to bid for the set of advertisement space recommended by the advertisement space recommendation module to exhibit the corresponding plurality of products;
   a checkout URL generator module configured to:
   create a distinctive uniform resource locator (URL) for each of the plurality of products corresponding to the set of advertisement space biding by each of the plurality of products corresponding to the auction module; and
   enable one-click checkout process for the plurality of products displayed on the set of advertisement space on the advertisement platform based on the distinctive URL for the plurality of products across one or more merchants, wherein the distinctive URL is configured to open checkout page of the one or more e-commerce websites of the corresponding one or more merchants.

2. The server of claim 1, wherein the set of advertisement space comprises one or more unoccupied advertisement slots in the advertisement platform.

3. The server of claim 1, wherein the data corresponding to the plurality of data sources comprises at least one of a demand from the one or more merchants, premium demanded by the advertisement platform, demographics and budget.

4. The server of claim 1, wherein the advertisement space recommendation module is configured to access data corresponding to the set of advertisement space over a network.

5. The server of claim 1, wherein the advertisement space recommendation module is configured to display data related to the set of advertisement space on the user interface, wherein the data is displayed by receiving user input corresponding to the selection from the set of advertisement space.

6. The server of claim 1, wherein the checkout URL generator module is configured to store the user information to enable one-click checkout process for following transactions from corresponding user interface.

7. The server of claim 1, wherein the advertisement platform comprises at least one of a social network platform, a search engine platform, the e-commerce platform, a mobile application or a physical billboard.

8. The server of claim 7, wherein the physical billboard is associated with a scanning code comprising a barcode, a QR code or a picture to identify the plurality of products.

9. The server of claim 1, wherein the one-click checkout process is executed either synchronously or in a batch mode asynchronously at a scheduled time.

10. The server of claim 1, wherein the checkout URL generator module is configured to fill a web based form for a user and make one or more API calls to the at least one of the social network platform and the e-commerce platform to enable the one-click checkout flow.

11. The server of claim 1, wherein the processing subsystem comprises an inventory tracking module operatively coupled to the advertisement space recommendation module, wherein the inventory tracking module is configured to:
  track inventory associated with the one or more e-commerce websites of the corresponding merchant for the advertisement space recommended by the advertisement space recommendation module; and
  stop the advertisement on the advertisement space when one of the plurality of product displayed on the advertisement is out of stock upon tracking the inventory.

12. A method comprising:
  receiving, by the data collection module, data corresponding to a plurality of data sources from one or more merchants;
  determining, by an advertisement space recommendation module, an expected network traffic for each of a plurality of products;
  determining, by an advertisement space recommendation module, a plurality of estimated flow rates corresponding to the one or more merchants based on the expected network traffic of each of the plurality of products, wherein each of the plurality of estimated flow rate corresponds to product;
  determining, by the advertisement space recommendation module, expected profits corresponding to the one or more merchants based on expected network traffic of the plurality of products;
  generating, by the advertisement space recommendation module, a recommendation corresponding to a set of advertisement space to the one or more merchants for selling the plurality of products upon determining the expected profits, relevancy of an advertisement platform corresponding to the plurality of products and the data received by the data collection module;
  enabling, by an auction module, the one or more merchants to bid for the set of advertisement space recommended by the advertisement space recommendation module to exhibit the corresponding plurality of products;
  creating, by a checkout URL generator module, a distinctive uniform resource locator (URL) for each of the plurality of products corresponding to the set of advertisement space bidding by the one or more merchants via the auction module; and
  enabling, by the checkout URL generator module, one-click checkout process for the plurality of products displayed on the set of advertisement space on the advertisement platform based on the distinctive URL for the plurality of products across one or more merchants, wherein the distinctive URL is configured to open checkout page of the one or more e-commerce websites of the corresponding one or more merchants.

13. The method of claim 12, wherein determining the set of advertisement space comprises determining one or more pre-occupied advertisement slots in at least one of the social network platform and the e-commerce platform.

14. The method of claim 12, wherein determining the set of advertisement space comprises determining one or more unoccupied advertisement slots in at least one of the social network platform and the e-commerce platform.

15. The method of claim 12, wherein determining the expected network traffic for each of the plurality of products comprises accessing data corresponding to the set of advertisement space over a network.

16. The method of claim 12, comprising displaying, by the advertisement space recommendation module, data related to the set of advertisement space on the user interface, wherein data is displayed by receiving user input corresponding to the selection from the set of advertisement space.

17. The method of claim 12, comprising storing, by the checkout processing module, the user information to enable one-click checkout process for following transactions from corresponding user interface.

\* \* \* \* \*

UNITED STATES PATENT AND TRADEMARK OFFICE
CERTIFICATE OF CORRECTION

PATENT NO. : 11,551,258 B1
APPLICATION NO. : 17/317952
DATED : January 10, 2023
INVENTOR(S) : Kumar N. Senthil et al.

It is certified that error appears in the above-identified patent and that said Letters Patent is hereby corrected as shown below:

On the Title Page

Item (12), "Senthil" should read --Senthil et al.--

Item (72), add Stella Rowlett, Redmond, WA (US)

Signed and Sealed this
Sixteenth Day of May, 2023

Katherine Kelly Vidal
*Director of the United States Patent and Trademark Office*